US012294936B2

United States Patent
Ha

(10) Patent No.: US 12,294,936 B2
(45) Date of Patent: May 6, 2025

(54) COMMUNICATING OVER A LOCAL AREA NETWORK CONNECTION BETWEEN A RADIO ACCESS NODE AND A USER EQUIPMENT RELAY

(71) Applicant: Nokia Solutions and Networks Oy, Espoo (FI)

(72) Inventor: Thanh-Hoai Ha, Bartlett, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 309 days.

(21) Appl. No.: 16/498,715

(22) PCT Filed: May 9, 2017

(86) PCT No.: PCT/US2017/025720
§ 371 (c)(1),
(2) Date: Sep. 27, 2019

(87) PCT Pub. No.: WO2018/208275
PCT Pub. Date: Nov. 15, 2018

(65) Prior Publication Data
US 2020/0045614 A1    Feb. 6, 2020

(51) Int. Cl.
*H04W 48/06* (2009.01)
*H04W 28/12* (2009.01)
(Continued)

(52) U.S. Cl.
CPC ........... *H04W 48/06* (2013.01); *H04W 28/12* (2013.01); *H04W 28/20* (2013.01); *H04W 88/14* (2013.01);
(Continued)

(58) Field of Classification Search
CPC ........... H04B 7/15528; H04L 12/2858; H04W 28/0289; H04W 28/12; H04W 28/20;
(Continued)

(56) References Cited

U.S. PATENT DOCUMENTS 7,730,230 B1 * 6/2010 Kondapalli ........... G06F 13/385
710/15
8,873,455 B2   10/2014 Speight et al.
(Continued)

FOREIGN PATENT DOCUMENTS

CN    104521280 A    4/2015
CN    105981431 A    9/2016
(Continued)

OTHER PUBLICATIONS

Raghothaman et al., "System Architecture for a Cellular Network with UE Relays for Capacity and Coverage Enhancement", InterDigital, Jan. 2012, 6 pages.
(Continued)

*Primary Examiner* — Syed Ali
(74) *Attorney, Agent, or Firm* — Nokia Technologies Oy

(57) ABSTRACT

This specification describes a method comprising generating a message for communication over a local area network connection between a radio access node and a user equipment relay, the message including: an identifier for indicating that the message includes control information for eliciting a responsive operation by a receiving one of the radio access node and the user equipment relay, and the control information, the method further comprising causing transmission of the generated message over the local area network connection from a transmitting one of the radio access node and the user equipment relay to the receiving one of the radio access node and the user equipment relay.

17 Claims, 3 Drawing Sheets

(51) Int. Cl.
*H04W 28/20* (2009.01)
*H04W 88/14* (2009.01)
*H04W 88/18* (2009.01)
*H04W 28/02* (2009.01)

(52) U.S. Cl.
CPC ...... *H04W 88/184* (2013.01); *H04W 28/0289* (2013.01)

(58) Field of Classification Search
CPC ..... H04W 40/22; H04W 48/06; H04W 48/14; H04W 76/11; H04W 76/12; H04W 84/047; H04W 88/04; H04W 88/14; H04W 88/184; H04W 92/10; H04W 92/20
See application file for complete search history.

(56) References Cited

U.S. PATENT DOCUMENTS

| | | | |
|---|---|---|---|
| 9,386,441 | B2 | 7/2016 | Prakash et al. |
| 9,706,583 | B1* | 7/2017 | Pawar .................. H04W 36/03 |
| 2002/0082006 | A1* | 6/2002 | Narvanen ............. H04W 76/10 455/560 |
| 2006/0227738 | A1* | 10/2006 | Nakajima ......... H04L 29/12009 370/328 |
| 2008/0049621 | A1* | 2/2008 | McGuire ............. H04L 12/6418 370/236.2 |
| 2008/0117884 | A1* | 5/2008 | Ishii ...................... H04W 92/02 370/338 |
| 2010/0020681 | A1* | 1/2010 | Nakashima ............. H04L 47/14 370/229 |
| 2010/0103865 | A1 | 4/2010 | Ulupinar et al. |
| 2012/0087298 | A1 | 4/2012 | Garavagila et al. |
| 2012/0092988 | A1* | 4/2012 | Zhou ..................... H04L 47/127 370/230 |
| 2012/0163287 | A1 | 6/2012 | Raaf et al. |
| 2013/0195012 | A1* | 8/2013 | Laitila .................. H04W 76/00 370/328 |
| 2013/0315134 | A1 | 11/2013 | Halfmann et al. |
| 2014/0226481 | A1* | 8/2014 | Dahod .............. H04W 36/0055 370/235 |
| 2015/0094061 | A1 | 4/2015 | Mildh et al. |
| 2015/0264726 | A1* | 9/2015 | Zhu ....................... H04W 28/08 370/329 |
| 2015/0341830 | A1* | 11/2015 | Jeong ................ H04W 28/0268 370/329 |
| 2016/0037568 | A1* | 2/2016 | Hakola ............... H04W 72/085 370/329 |
| 2016/0150058 | A1 | 5/2016 | Wentink et al. |
| 2016/0157293 | A1* | 6/2016 | Pazhyannur .......... H04W 76/27 370/329 |
| 2016/0192439 | A1 | 6/2016 | Phuyal et al. |
| 2016/0353432 | A1* | 12/2016 | Xu ......................... H04W 72/20 |
| 2017/0230891 | A1* | 8/2017 | Fang .................... H04W 84/047 |
| 2017/0303189 | A1* | 10/2017 | Hampel ................ H04W 48/16 |
| 2017/0353983 | A1* | 12/2017 | Grayson ............... H04W 12/06 |
| 2018/0034662 | A1* | 2/2018 | Ku ........................... H04L 45/04 |
| 2018/0041930 | A1* | 2/2018 | Hampel ................ H04W 88/10 |
| 2018/0063753 | A1* | 3/2018 | Cao ........................ H04W 76/12 |
| 2018/0192345 | A1* | 7/2018 | Yun ...................... H04W 36/30 |
| 2018/0351844 | A1* | 12/2018 | Viox ..................... H04W 24/02 |
| 2018/0367578 | A1* | 12/2018 | Verma ................... H04W 24/08 |
| 2019/0306898 | A1* | 10/2019 | Goddeti ............... H04W 76/12 |
| 2019/0313275 | A1* | 10/2019 | Chen ................... H04W 28/24 |
| 2019/0364456 | A1* | 11/2019 | Yu ........................... H04W 76/11 |
| 2020/0068419 | A1* | 2/2020 | Decuir ................. H04W 88/16 |
| 2020/0260463 | A1* | 8/2020 | Lovlekar ............... H04W 76/15 |
| 2021/0022043 | A1* | 1/2021 | Soryal ................. H04L 63/0876 |
| 2022/0321481 | A1* | 10/2022 | Jeong ..................... H04L 47/20 |

FOREIGN PATENT DOCUMENTS

| | | |
|---|---|---|
| EP | 3117658 A1 | 1/2017 |
| WO | 2015/138075 A1 | 9/2015 |

OTHER PUBLICATIONS

Bulakci, "On Backhauling of Relay Enhanced Networks in LTE-Advanced", Licentiate Seminar, Department of Communications and Networking, 2010, pp. 1-4.

International Search Report and Written Opinion received for corresponding Patent Cooperation Treaty Application No. PCT/US2017/025720, dated Jul. 21, 2017, 20 pages.

Office action received for corresponding Chinese Patent Application No. 201780090222.9, dated Mar. 8, 2021, 7 pages of office action and 6 pages of Translation available.

Extended European Search Report received for corresponding European Patent Application No. 17909422.2, dated Nov. 30, 2020, 11 pages.

Nuggehalli, "LTE-WLAN aggregation [Industry Perspectives]", IEEE Wireless Communications, vol. 23, No. 4, Aug. 2016, pp. 4-6.

European Patent Office issued in corresponding European Patent Application No. 17 909 422.2-1215 on Aug. 13, 2024.

* cited by examiner

COMMUNICATING OVER A LOCAL AREA NETWORK CONNECTION BETWEEN A RADIO ACCESS NODE AND A USER EQUIPMENT RELAY

RELATED APPLICATION

This application was originally filed as PCT Application No. PCT/US2017/025720 filed May 9, 2017.

FIELD

This specification relates generally to communications over a local area network connection between a radio access node and a user equipment relay.

BACKGROUND

Small cell radio access nodes (also referred to simply as small cells) are small base stations or eNodeBs (eNBs) which can be used in mobile communication networks of any generation, e.g. 3G, 4G or 5G. They are "small" compared to "macrocells" (which are served by a high power cellular base station), partly because they tend to have a shorter range (from 10 meters within urban and in-building locations to 2 km for a rural location) and partly because they typically handle fewer concurrent calls or sessions. The term "small cell" may encompass, but is not limited to, "femtocells", "picocells", and "microcells". Benefits of small cells arise from the fact that they enable better use of available spectrum by re-using the same frequencies many times within a geographical area. In addition, they may allow the area served by a macrocell to be increased.

Small cells were first introduced in 3G, are becoming increasingly important in 4G, and may become a critical component of 5G. One of the challenges faced by network operators when deploying small cells is how best to form the backhaul in order to connect small cells to the core network in a timely and cost-effective way.

SUMMARY

In a first aspect, this specification describes a method comprising generating a message for communication over a local area network connection between a radio access node and a user equipment relay, the message including an identifier for indicating that the message includes control information for eliciting a responsive operation by a receiving one of the radio access node and the user equipment relay, and the control information. The method further comprises causing transmission of the generated message over the local area network connection from a transmitting one of the radio access node and the user equipment relay to the receiving one of the radio access node and the user equipment relay.

In a second aspect, this specification describes a method comprising determining that a message received over a local area network connection between a radio access node and the user equipment relay includes an identifier which indicates that the message includes control information for eliciting a responsive operation by a receiving one of the radio access node and the user equipment relay, and responding to the determination by decoding the control information and causing performance of the responsive operation.

In a third aspect, this specification describes apparatus comprising at least one processor and at least one memory including computer program code which, when executed by the at least one processor, causes the apparatus: to generate a message for communication over a local area network connection between a radio access node and a user equipment relay, the message including an identifier for indicating that the message includes control information for eliciting a responsive operation by a receiving one of the radio access node and the user equipment relay, and the control information; and to transmit the generated message over the local area network connection from a transmitting one of the radio access node and the user equipment relay to the receiving one of the radio access node and the user equipment relay.

In a fourth aspect, this specification describes apparatus comprising at least one processor, and at least one memory including computer program code which, when executed by the at least one processor, causes the apparatus: to determine that a message received over a local area network connection between a radio access node and the user equipment relay includes an identifier which indicates that the message includes control information for eliciting a responsive operation by a receiving one of the radio access node and the user equipment relay; and to respond to the determination by decoding the control information and causing performance of the responsive operation.

In a fifth aspect, this specification describes computer-readable medium having computer-readable code stored thereon, the computer readable code, when executed by a least one processor, cause performance of at least generating a message for communication over a local area network connection between a radio access node and a user equipment relay, the message including an identifier for indicating that the message includes control information for eliciting a responsive operation by a receiving one of the radio access node and the user equipment relay, and the control information, and causing transmission of the generated message over the local area network connection from a transmitting one of the radio access node and the user equipment relay to the receiving one of the radio access node and the user equipment relay.

In a sixth aspect, this specification describes computer-readable medium having computer-readable code stored thereon, the computer readable code, when executed by a least one processor, causing performance of at least determining that a message received over a local area network connection between a radio access node and the user equipment relay includes an identifier which indicates that the message includes control information for eliciting a responsive operation by a receiving one of the radio access node and the user equipment relay, and responding to the determination by decoding the control information and causing performance of the responsive operation.

In a seventh aspect, this specification describes apparatus comprising means for generating a message for communication over a local area network connection between a radio access node and a user equipment relay, the message including an identifier for indicating that the message includes control information for eliciting a responsive operation by a receiving one of the radio access node and the user equipment relay, and the control information, and means for causing transmission of the generated message over the local area network connection from a transmitting one of the radio access node and the user equipment relay to the receiving one of the radio access node and the user equipment relay.

In an eighth aspect, this specification describes apparatus comprising means for determining that a message received over a local area network connection between a radio access node and the user equipment relay includes an identifier which indicates that the message includes control information for eliciting a responsive operation by a receiving one of the radio access node and the user equipment relay, and means for responding to the determination by decoding the control information and causing performance of the responsive operation.

In a ninth aspect, this specification describes computer readable code which, when executed by computing apparatus, causes the computing apparatus to perform a method according to either of first and second aspects.

In a tenth aspect, this specification describes apparatus configured to perform a method according to either of the first and second aspects.

The local area network connection of any of the above-described aspects may be an ethernet connection between the radio access node and the user equipment relay. The identifier may be included in an EtherType field of the generated message.

The control information of any of the above-described aspects may be for requesting a modification of a behaviour, or for triggering a new behaviour, of the receiving one of the radio access node and the user equipment relay.

The control information of any of the above-described aspects may be for notifying the receiving one of the radio access node and the user equipment relay of a status of the transmitting one of the receiving one of the radio access node and the user equipment relay.

The control information of any of the above-described aspects may be for soliciting a status indication from the receiving one of the radio access node and the user equipment relay.

The generated message of any of the above-described aspects may be caused to be transmitted from the radio access node to the user equipment relay. In such examples, the control information may be for eliciting performance by the user equipment relay of a reset operation. Alternatively, the control information may be for eliciting performance by the user equipment relay of a modification of bandwidth allocated to a dedicated bearer.

In other examples, the generated message of any of the above-described aspects may be caused to be transmitted from the user equipment relay to the radio access node. For instance, the control information may be for eliciting implementation by the radio access node of a congestion control mechanism or for eliciting termination by the radio access node of a congestion control mechanism. The congestion control mechanism may specify that service to at least some user equipments not already being served by the radio access node should be denied. Alternatively or additionally, the congestion control mechanism may specify that service being provided to at least one user equipment being served by the radio access node should be throttled. In other examples, the control information may indicate that a connection between the user equipment relay and a core network has been restored.

The local area network connection of any of the above-described aspects may be a wired connection between the radio access node and the user equipment relay. Alternatively, the local area network connection may be a wireless connection.

The radio access node and the user equipment relay of any of the above-described aspects may be mounted on a common structural element (e.g. the same street-light pole). The radio access node and the user equipment relay may be provided in a common housing or in separate housings.

BRIEF DESCRIPTION OF THE FIGURES

For better understanding of the present application, reference will now be made, by way of example only, to the accompanying drawings in which.

DETAILED DESCRIPTION

Figure 1:
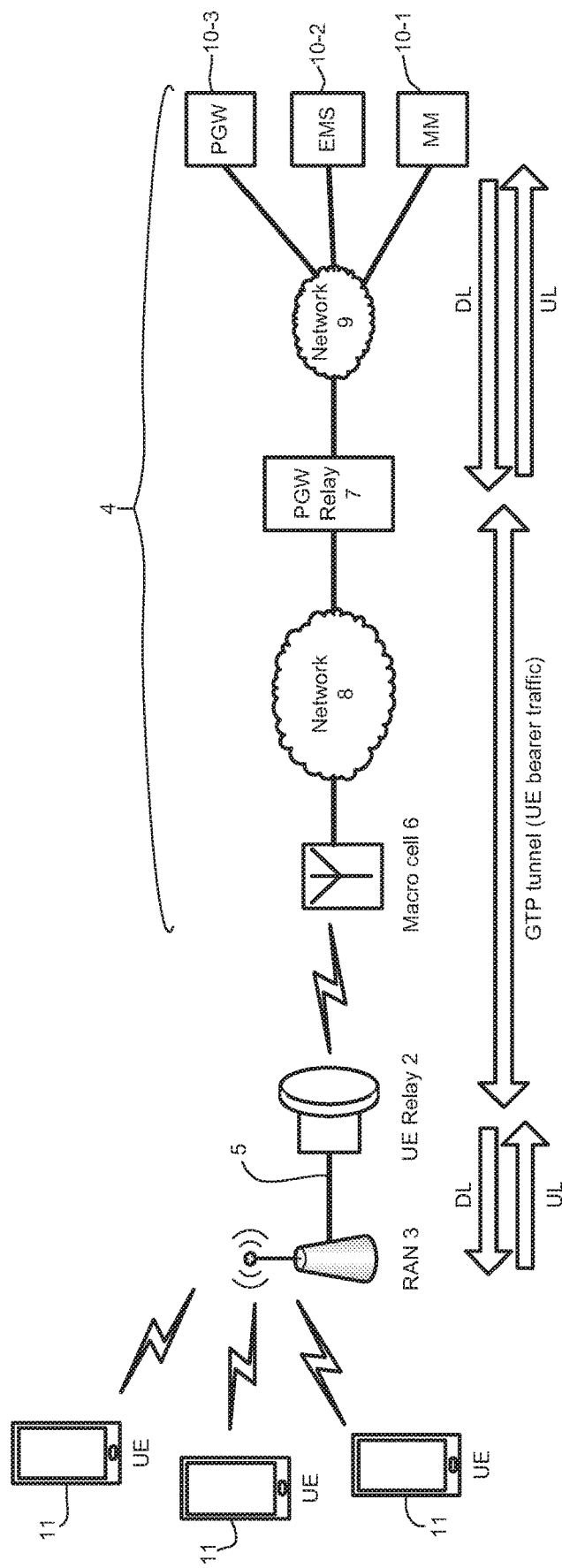
FIG. 1 is an example of a mobile telecommunications radio access network including a small cell radio access node and a user equipment relay (UER)

In the description and drawings, like reference numerals refer to like elements throughout.

Wireless data network operators have recently started making use of a concept known as user equipment relay (UE Relay or Relay UE) in order to provide the backhaul connection between radio access nodes (RANs) and the core network. FIG. 1 illustrates an example of a mobile telecommunications radio access network 1 which includes a UE relay 2 and in the context of which various methods and apparatuses described herein may be implemented.

As illustrated in FIG. 1, UE relay backhaul comprises using a user equipment (UE) 2 that is generally co-located with a radio access node (RAN) 3, which may typically be a small cell RAN (or, more simply, a "small cell"), to provide a wireless backhaul connection to a network 4. In the example of FIG. 1, the UE relay 2 is directly connected to the small cell RAN 3, via a local network connection 5 (wired or wireless) which may be, for instance, an Ethernet connection. The UE relay 2 is wirelessly connected with a macrocell 6 (or donor eNB) in a standard way, with the wireless connection with the macrocell 6 forming part of the backhaul for the small cell RAN 3. In some implementations, the small cell RAN 3 and the UE relay 2 may be mounted on the same structural element, for instance on the same street-light pole. In some implementations, the small cell RAN 3 and the UE relay 2 may be provided in a common enclosure (or housing) while, in other implementations, they may be provided in separate enclosures. Put another way, the LAN connection may be internal or may be external. As will be discussed again later, the small cell RAN 3 and the UE relay 2 may utilise the same IP address.

The network 4 comprises one or more macrocells 6 which are connected to a packet data network gateway (PGW) relay 7 via a network connection 8. The PGW relay 7 may be connected to the network functionality 10 via another network connection 9. As illustrated in FIG. 1, the network functionality 10 may include, for instance, mobility management entity (MME) functionality 10-1, element management system (EMS) functionality 10-2 and other gateway entities 10-3 which may include PGWs and/or serving gateways (SGWs).

The example shown is FIG. 1 is a "Network-In-Network" implementation with double tunnelling. More specifically, the system includes two "core networks". The first core network which includes the PGW relay 7 is the core network for the macrocell 6 serving the UE relay 2. The second "core network", which includes the PGW 10-3/EMS 10-2/MME 10-1, is the core network for the RAN 3 serving the UEs 11. Traffic for the second core network (including PGW 10-3/EMS 10-2/MME 10-1) is encapsulated inside the GTP tunnel terminating at the first core network (which includes the PGW relay 7).

In order to provide the backhaul to the network 9 and the and the PGW 10-3/EMS 10-2/MME 10-1, a GPRS tunnelling protocol (GTP) tunnel is set up between the UE relay 2 and the PGW relay 7. Traffic which passes through the GTP tunnel includes data derived from, and intended for, one or more UEs 11 that are being served by the small RAN 3. Such data may be referred to as user plane (U-plane) traffic. Management plane (M-plane) and control plane (C-plane) traffic for the small cell RAN 3 may also be transported via the GTP tunnel. All small cell traffic (regardless of the type of the traffic) may be carried in the GTP tunnel as bearer traffic of the UE relay 2.

In the downlink direction, the UE relay 2 encapsulates the traffic and then sends it via the GTP tunnel to the PGW relay 7. Upon arrival at the PGW Relay 7, the traffic is GTP decapsulated and is then forwarded to the network functionalities 10, as appropriate.

In the uplink direction, since the UE relay 2 and the small cell RAN 3 have the same IP address, the network 4 handles the traffic as if it is destined to the UE relay 2. As such, the network sends it to the PGW relay 7, since the PGW relay 7 represents the UE relay 2 in the network 4. The PGW relay 7 encapsulates the data arriving from the network 4 and sends it to the UE relay 2, via the GTP tunnel. When this traffic arrives at the UE relay 2, the UE relay 2 decapsulates the traffic and forwards it to the small cell RAN 3.

In current small cell network implementations, the small cell RAN 3 and the UE relay 2 are unable to communicate with one another in a direct fashion. This is at least in part because they have the same IP address. This inability to communicate, although not critical (in that current networks which include small cells with UE relays are able to function sufficiently well to provide service to UEs 11 served by the small cell), is sub-optimal.

The following describes methods and apparatuses for enabling communication between small cell RANs 3 and UE relays 2 over a local area network connection 5, thereby to improve the performance of mobile data networks such as that described above with reference to FIG. 1.

In the various examples described below, one or both of the two entities participating in the communication (that is the small cell RAN 3 and the UE relay 2) are configured to generate a message for communication over the LAN connection 5 between the two entities. The message includes control information for eliciting, prompting or otherwise causing performance of a responsive operation by the one of the small cell RAN 3 and the UE relay 2 which receives the message (also referred to as "the receiving entity). In addition, the message includes an identifier for indicating to the receiving entity that the message includes the control information. After generation, the message is caused to be transmitted (by the "transmitting entity") over the LAN connection 5 between the two entities.

The messages exchanged between the small cell RAN 3 and the UE relay 2, which include the control information, may be referred to as a "Relay Control Protocol over LAN" (RCPoL) messages. The identifier may therefore serve to indicate that a received message is an RCPoL message. As such, the receiving entity may respond to detection of the presence of the identifier in a received message, by extracting the control information from the message and responding accordingly.

Put another way, one or both of the entities (that is the small cell RAN 3 and the UE relay 2) are configured to determine that a message received over the LAN connection 5 includes the identifier, the identifier indicating that the message includes control information for prompting performance of a responsive operation by the receiving entity. The receiving entity is further configured to respond to determining that the message includes the identifier by causing performance of the responsive operation based on the control information.

The control information included in the message may serve a variety of different purposes. For instance, the control information may serve to request a modification of a behaviour of the receiving entity. In such examples, the responsive operation may be the receiving entity modifying its behaviour. In other examples, the control information may be for notifying the receiving entity as to a status of the transmitting entity, with the receiving entity performing a responsive operation in dependence on the nature of the notification. In yet other examples, the control information may be for soliciting a status indication from the receiving entity. The responsive action may, in this example, be the provision of the status indication by the receiving entity to the transmitting entity.

As discussed above, the LAN connection 5 is a wired connection, which may be an Ethernet connection. In implementations in which the LAN connection is an Ethernet connection, the message may include an Ethernet frame. The identifier may be included in an EtherType field of the Ethernet frame.

Figure 2:
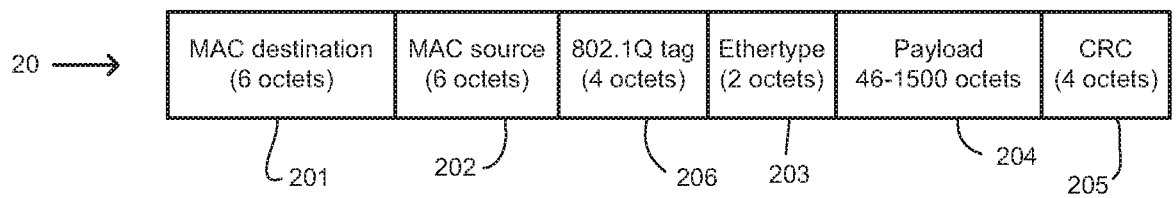
FIG. 2 is a schematic illustration of an example of a format of a frame which may be included in messages passed over a LAN connection between a radio access node and a user equipment relay.

The message may include a frame which has a format similar to that of the frame 20 illustrated in FIG. 2. In the example of FIG. 2, the frame 20 includes a first field 201 which indicates the MAC address of the destination of the frame. As such, when the frame 20 is transmitted across the LAN connection 5 from the UE relay 2 to the small cell RAN 3, the first field indicates MAC address of the small cell RAN and vice versa. In a second field 202, the frame 20 indicates the MAC address of the source of the frame 20. As will be appreciated, the MAC addresses of the two entities 2, 3 are different and so can be used for addressing the message.

The identifier for indicating presence of the control information may be included in a third field 203 which, in an Ethernet implementation, may be referred to as the Ethertype field. The payload of the frame 20 may be included in a fourth field 204. The control information which is carried by the frame 20 may be included in the payload field. In a fifth field 205, the frame 20 may include error check data (e.g. CRC data). In some implementations, the frame 20 may additionally include an 802.1Q tag field 206.

In Ethernet implementations, a new Ethertype identifier (ID), which is present in the Ethertype field 203, may be defined which allows the exchange of messages between the small cell RAN 3 and the UE relay 2 at layer 2. Put another way, the new Ethertype ID may serve indicate that a received message is a RCPoL message.

The following is a discussion of four specific examples of control information which may be transmitted using RCPoL messages. However, as will be appreciated, the methods and apparatuses described herein are not limited to these specific examples.

Relay Reset Messages

This type of RCPoL message may be transmitted from the small cell RAN 3 to the UE relay 2. A relay reset message may include control information for prompting performance by the UE relay 2 of a reset operation. As such, in response to receiving a message of this type from the small cell RAN 3, the UE relay 2 may perform a reset operation, in which it resets itself.

A relay reset message may be generated and transmitted by the small cell RAN 3 in response to a recognition by the small cell RAN 3 that the UE relay 2 backhaul is not functioning correctly. In response, the UE relay 2 resets itself in order to recover from the error condition.

Relay Bearer Modification Messages

This type of RCPoL message may be transmitted from the small cell RAN 3 to the UE relay 2. A relay bearer modification message may include control information for prompting performance by the UE relay 2 of a modification of bandwidth allocated to a dedicated bearer. The dedicated bearers, which may be configured with a guaranteed bit rate (GBR) and/or a maximum bit rate (MBR) in either of the uplink or downlink directions, may be used by the UE relay 2 to transport the small cell traffic types that require a higher quality of service (QoS) than other traffic types transported in the default bearer.

The small cell RAN 3 may be configured to generate and transmit a relay bearer modification message in response to a request from a UE 11, which is being served by the small cell RAN 3, to establish or tear down a high priority communication session, e.g. a call session, for instance using VoIP (which in an LTE network may be referred to as VoLTE). Such high priority communication sessions require higher bandwidth and QoS.

The UE relay 2 may be configured to respond to receiving a relay bearer modification message by increasing or decreasing, as required, a pre-established dedicated bearer bandwidth which is reserved for high priority communication sessions (e.g. VoLTE etc.).

Congestion Notification Messages

This type of RCPoL message may be transmitted from the UE relay 2 to the small cell RAN 3. A congestion notification message may include control information, which notifies the receiving entity (in this case the small cell RAN 3), that the UE relay 2 is congested. As such, the UE relay 2 may be configured to generate and transmit a congestion notification message in response to determining that it is congested.

The small cell RAN 3 may be configured to respond to the notification that the UE relay 2 is congested by triggering a congestion control mechanism. Such a congestion control mechanism may include, for instance, not accepting (or denying) requests for new communication sessions from UEs 11 which are currently not being served and/or reducing the bandwidth allocated to (or throttling) low priority communication sessions.

The congestion notification message may alternatively include control information, which notifies the receiving entity (in this case the small cell RAN 3), that the UE relay 2 is no longer congested. The small cell RAN 3 may be configured to respond to the notification that the UE relay 2 is no longer congested by terminating/stopping the congestion control mechanism.

Relay Recovery Messages

This type of RCPoL message may be transmitted from the UE relay 2 to the small cell RAN 3. A relay recovery message may include control information which notifies the small cell RAN 3 that the UE relay 2 has just re-attached to the macrocell after having been previously detached from the macrocell. Alternatively or additionally, the control information may notify the small cell RAN 3 that the UE relay 2 has just restored its PDN connection that is bridged to the small cell RAN after a PDN connection loss. As such, the UE relay 2 may be configured to generate and transmit a relay recovery message in response to re-attachment to the macrocell and/or to restoration of a PDN connection.

The small cell RAN 3 may be configured to respond to receipt of a relay recovery message by performing necessary responsive operations. For instance, in response to being notified that the PDN connection has been restored or that the UE relay 2 has just re-attached to the macrocell, the small cell RAN 3 may be configured to re-trigger performance of the Dynamic Host Configuration Protocol (DHCP) in order to obtain an IP address (since loss of PDN connection and detachment from the macrocell result in the PGW relay 7, releasing the IP address previously allocated to the small cell RAN 3).

As will be appreciated from the above description, the ability for the small cell RAN 3 and the UE relay 2 to communicate with one another allows the two devices to operate synchronously and in dependence on one another. As such, it allows the UE relay backhaul to evolve from a crude backhaul solution to a more finely tuned one. For instance, the communication (e.g. using bearer modification messages and/or congestion notification messages) may ensure high QoS requirements may be met. Also, communication between the two entities (e.g. using relay reset and/or relay recovery messages) may allow recovery of the backhaul without manual intervention. In general, the ability of the small cell RAN 3 to communicate with the UE relay 2 significantly improves the UE relay backhaul solution.

Figure 3A:
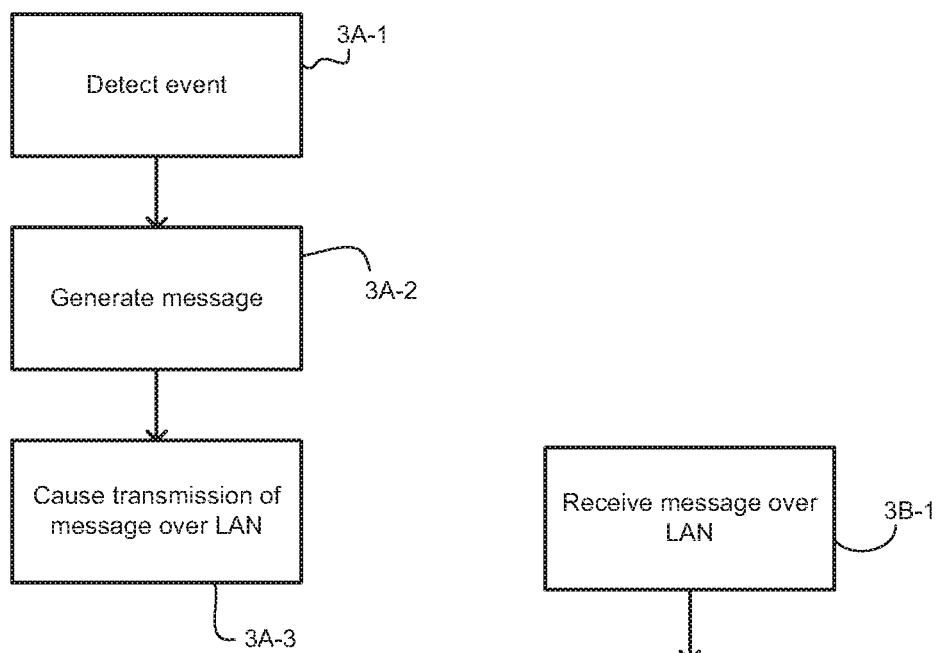
FIG. 3A is a flowchart illustrating various operations which may be performed by either one of a radio access node and a user equipment relay when transmitting a message over a LAN connection to the other one of the radio access node and the user equipment relay.
Figure 3B:
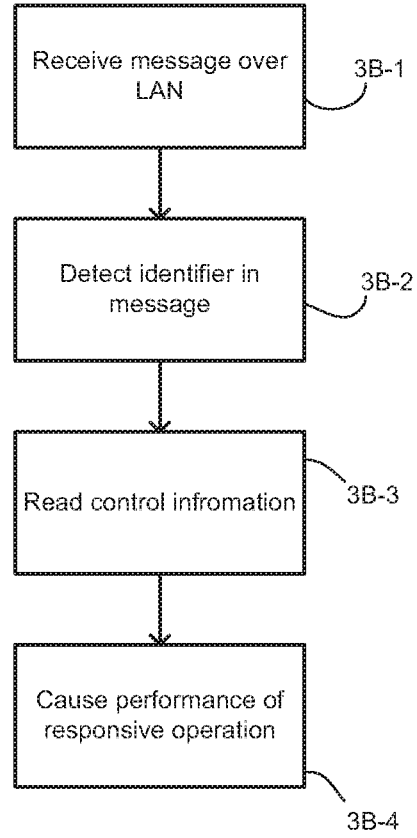
FIG. 3B is a flowchart illustrating various operations which may be performed by either one of the radio access node and the user equipment relay when receiving a message across the LAN connection.

FIGS. 3A and 3B are flow charts illustrating operations which may be performed by UE relays 2 and small cell RANs 3 when communicating with one another over a LAN connection 5. More specifically, FIG. 3A includes operations which may be performed by a transmitting one of the two entities and FIG. 3B includes operations which may be performed by the receiving entity.

Referring first to FIG. 3A, in operation S3A-1, the transmitting one of the UE relay 2 and the small cell RAN 3 detects, or determines occurrence of, a particular event. Such events, in response to which the transmitting entity may generate and transmit a message over the LAN connection 5 to receiving entity, may include one or more of, for instance: a determination by the UE relay 3 that it has become congested or is no longer congested, a determination by the UE relay 3 that it has reattached to the macrocell, a determination by the UE relay 3 that it has restored its PDN connection, a determination by the small cell RAN 3 that the UE relay 2 is not functioning correctly, and a request, received at the small cell RAN 3 from one of the UEs 11 that it is currently serving, for the establishment or tearing down of a high priority communication session.

In operation S3A-2, the transmitting one of the UE relay 2 and the small cell RAN 3 generates the message. The message includes control information for prompting the receiving entity to perform a responsive operation. The nature of the control information and responsive operation may depend on the type of event detected. In addition to the control information, the message also includes the identifier which indicates the presence of the control information in the message. As discussed above, the identifier may be provided in an Ethertype field 203 of an Ethernet frame 20. The control information may be included in the payload. The message may additionally include a field which includes address information, for instance, in the form of a MAC address, of the receiving entity.

After generating the message, the transmitting one of the UE relay 2 and the small cell RAN 3, in operation S3A-3, causes transmission of the message across the LAN connection 5 to the receiving entity. As discussed above, in some examples, the LAN connection 5 is an Ethernet connection.

Referring now to FIG. 3B, in operation S3B-1, the receiving one of the UE relay 2 and the small cell RAN 3 receives the message via the LAN connection 5.

In operation S3B-2, the receiving entity detects the presence of the identifier in the message, which indicates that the message includes control information for prompting a responsive action by the receiving entity. Detection of the identifier may be achieved by examining a relevant field of the message, for instance, the Ethertype field. Based on the presence of the identifier in the message, the receiving entity is able to determine that the message is a RCPOL message.

In response to detecting the presence of the identifier in the message, the receiving one of the UE relay 2 and the small cell RAN 3, in operation S3B-3, reads the control information from the message. In operation S3B-4, the receiving one of the UE relay 2 and the small cell RAN 3 performs a responsive action, which is based on the control information read from the received message.

As discussed previously, the responsive action may include, for instance, the UE relay 2 resetting itself in response to the control information signifying a reset request or the UE relay 2 modifying an amount of bandwidth that is allocated to a dedicated bearer in response to the control information signifying a relay bearer modification request. Other examples of the responsive action include the small cell RAN 3 triggering a congestion control mechanism in response to the control information indicating that the UE relay 2 is congested, stopping a congestion control mechanism in response to the control information indicating that the UE relay 2 is no longer congested or the small cell RAN 3 taking responsive action (e.g. retriggering DHCP) when the control information indicates that the backhaul has recovered (e.g., the UE relay has reattached to the macrocell and/or the PDN connection has been restored).

As will be appreciated, these are only examples of the types of control information that may be sent and responsive actions that may be caused using RCPoL messages. Various other types of control information/responsive actions may be envisaged by the person skilled in the art.

Figure 4:
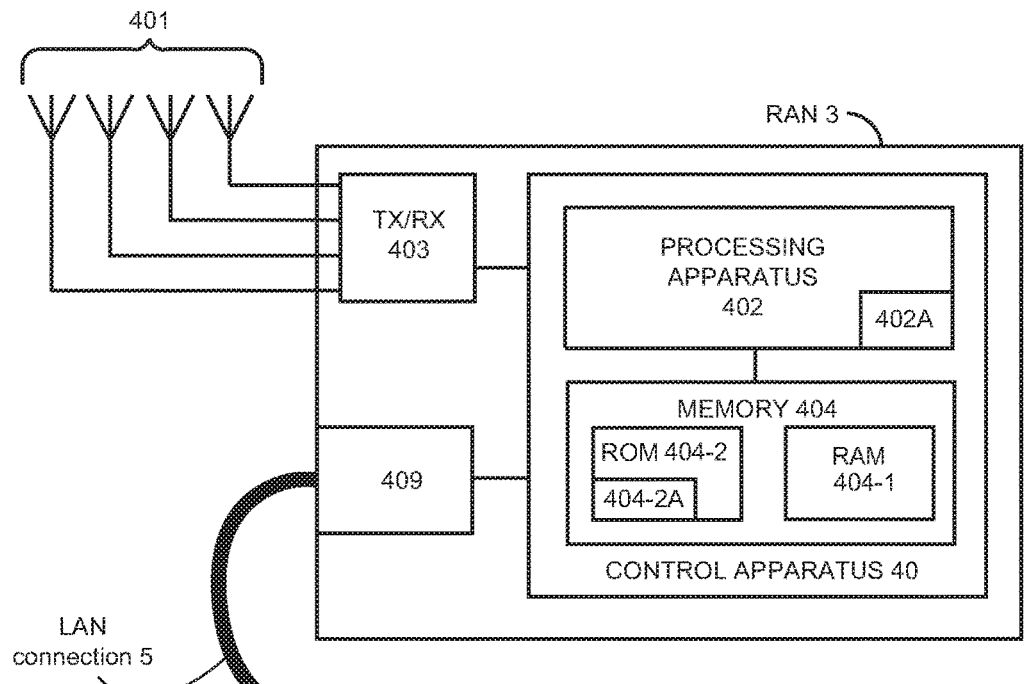
FIG. 4 is a schematic illustration of an example configuration of the radio access node of FIG. 1 which may communicate with a core network via a user equipment relay and which may perform various operations such as described with reference to FIGS. 3A and 3B.

FIG. 4 is a schematic illustration of an example configuration of a RAN 3 such as described with reference to FIGS. 1 to 3B, which may make use of a UE relay backhaul.

The RAN 3, which may be referred to a base station or access point (AP), may comprise a radio frequency antenna array 401 configured to receive and transmit radio frequency signals. Although the RAN 3 in FIG. 4 is shown as having an array 401 of four antennas, this is illustrative only and the number of antennas may vary.

The RAN 3 further comprises a radio frequency interface 403, which is configured to interface the radio frequency signals received and transmitted by the antenna 401. The radio frequency interface 403 may also be known as a transceiver. The RAN 3 also comprises a LAN physical interface 409 via which it can communicate with the UE relay 2 over the LAN connection 5.

In addition, the RAN 3 comprises a control apparatus 40. The RAN control apparatus 40 may be configured to process signals received from the radio frequency interface 403 and to control the radio frequency interface 403 to generate suitable RF signals to communicate information to the UEs 11 via a wireless communications link. The RAN control apparatus 40 may be configured to cause messages to be generated and transmitted to, and received from, the UE relay 2, across the LAN connection 5.

The control apparatus 40 may comprise processing apparatus 402 and memory 404. Computer-readable code 404-2A may be stored on the memory 404 and may, when executed by the processing apparatus 402, cause the control apparatus 40 to perform any of the operations described with reference to FIGS. 3A and 3B, as well as any other operations assigned to the RAN 3 and described with reference to FIGS. 1 and 2.

Figure 5:
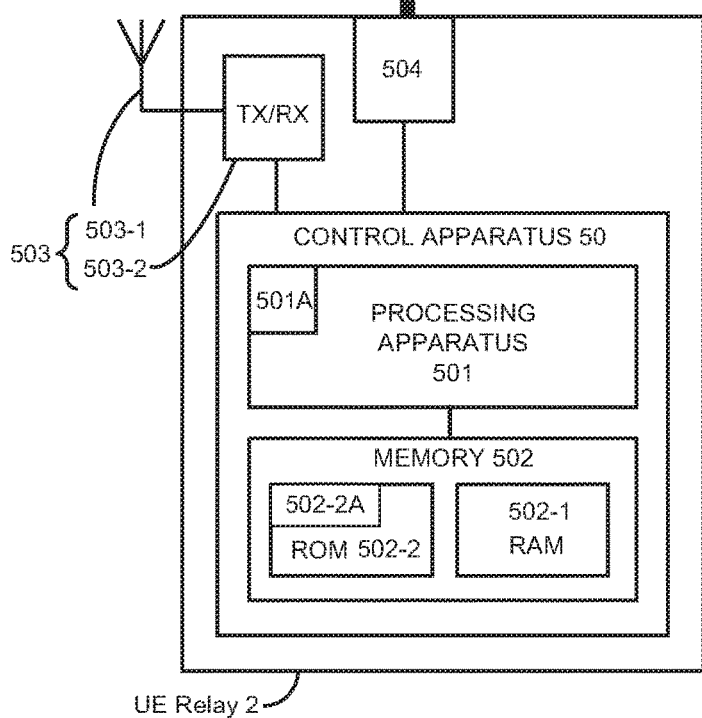
FIG. 5 is a schematic illustration of an example configuration of the user equipment relay of FIG. 1, which provides the backhaul connection for the radio access node of FIG. 1, and which may be configured to perform various operations such as described with reference to FIGS. 3A and 3B.

FIG. 5 is a schematic illustration of an example configuration of a UE relay 2 such as described with reference to FIGS. 1 to 3B, which may be used to provide the backhaul for a radio access node (such as a small cell radio access node). The UE relay 2 may be any device capable of forming a wireless connection with a macrocell 6, participating in a LAN connection with the RAN 3 and of performing the various operations described above with respect to UE relay 2 (for instance the operations described with reference to the flow charts of FIGS. 3A and 3B).

The UE relay 2 may be configured to communicate with the macrocell 6 via an appropriate radio interface arrangement 503. The interface arrangement 503 may be provided for example by means of a radio part 503-2 (e.g. a transceiver) and an associated antenna arrangement 503-1. The antenna arrangement 503-1 may be arranged internally or externally to the UE relay 2.

In addition, the UE relay 2 comprises a LAN physical interface 504 for receiving a LAN cable, thereby to form the LAN connection 5 with the RAN 3. The LAN physical interface 504 may be of any suitable type. For instance, in some specific examples, the LAN physical interface 504 may be an Ethernet port.

The UE relay 2 comprises control apparatus 50 which is operable to control the other components of the UE relay 2. In addition, the control apparatus 50 of the UE relay 2 is configured to cause performance of the operations described in connection with the UE relay 2 with reference to FIGS. 1, 2 and particularly with reference to FIGS. 3A to 3B. The control apparatus 50 may comprise processing apparatus 501 and memory 502. Computer-readable code 502-2A may be stored on the memory 502 which, when executed by the processing apparatus 501, causes the control apparatus 50 to perform any of the operations described herein in relation to the UE relay 2. Example configurations of the memory 502 and processing apparatus 501 will be discussed in more detail below.

As should of course be appreciated, the UE relay 2 and the RAN 3 shown in FIGS. 4 and 5 and described above may comprise further elements which are not directly involved with processes and operations in respect which this application is focussed.

Some further details of components and features of the above-described entities (i.e. the UE relay 2 and the RAN 3) and alternatives for them will now be described.

The control apparatuses 50, 40 described above may comprise processing apparatus 501, 402 communicatively coupled with memory 502, 404. The memory 502, 404 has computer readable instructions 502-2A, 404-2A stored thereon which, when executed by the processing apparatus 501, 402 causes the control apparatus 50, 40 to cause performance of various ones of the operations described with reference to FIGS. 1 to 3B. The control apparatus 50, 40 may, in some instances, be referred to as simply "apparatus".

The processing apparatus 501, 402 may be of any suitable composition and may include one or more processors 501A, 402A of any suitable type or suitable combination of types. Indeed, the term "processing apparatus" should be understood to encompass computers having differing architectures such as single/multi-processor architectures and sequencers/parallel architectures. For example, the processing apparatus 501, 402 may be a programmable processor that interprets computer program instructions 502-2A, 404-2A and processes data. The processing apparatus 501, 402 may include plural programmable processors. Alternatively, the processing apparatus 501, 402 may be, for example, programmable hardware with embedded firmware.

The processing apparatus 501, 402 may alternatively or additionally include one or more specialised circuit such as field programmable gate arrays FPGA, Application Specific Integrated Circuits (ASICs), signal processing devices etc. In some instances, processing apparatus 501, 402 may be referred to as computing apparatus or processing means.

The processing apparatus 501, 402 is coupled to the memory 502, 404 and is operable to read/write data to/from the memory 502, 404. The memory 502, 404 may comprise a single memory unit or a plurality of memory units, upon which the computer readable instructions (or code) 502-2A, 404-2A is stored. For example, the memory 502, 404 may comprise both volatile memory 502-1, 404-1 and non-volatile memory 502-2, 404-2. In such examples, the computer readable instructions/program code 502-2A, 404-2A may be stored in the non-volatile memory 502-2, 404-2 and may be executed by the processing apparatus 501, 402 using the volatile memory 502-1, 404-1 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 502, 404 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

Figure 6:
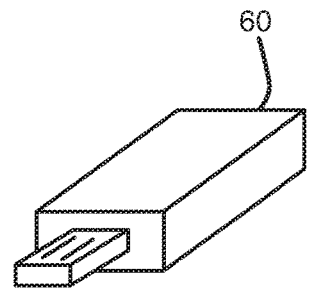
FIG. 6 is an illustration of a computer-readable medium upon which computer readable code may be stored.

The computer readable instructions/program code 502-2A, 404-2A may be pre-programmed into the control apparatus 50, 40. Alternatively, the computer readable instructions 502-2A, 404-2A may arrive at the control apparatus 50, 40 via an electromagnetic carrier signal or may be copied from a physical entity 60 such as a computer program product, a memory device or a record medium such as a CD-ROM or DVD, an example of which is illustrated in FIG. 6. The computer readable instructions 502-2A, 404-2A may provide the logic and routines that enables the entities 2, 3 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

It will be appreciated that methods and apparatuses described herein may be utilised in radio networks of various different types, which include but are not limited to 3G, 4G and 5G mobile networks.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
generating a message for communication over a local area network connection comprising an ethernet connection between a small cell and a user equipment relay, wherein the local area network connection is a wired connection between the small cell and the user equipment relay, wherein: the message includes an identifier included in an EtherType field of the message and indicating that the message includes control information for eliciting a responsive operation by a receiving one of the small cell and the user equipment relay, and the control information, and includes a medium access control address of the small cell and a medium access control address of the user equipment relay; and the user equipment relay is also connected to a macro cell; and
causing transmission of the generated message over the local area network connection from a transmitting one of the small cell and the user equipment relay to the receiving one of the small cell and the user equipment relay,
wherein the control information is for requesting a modification of a behavior, or triggering of a new behavior, of the receiving one of the small cell and the user equipment relay.

2. The method of claim 1, wherein the generated message is caused to be transmitted from the small cell to the user equipment relay.

3. The method of claim 2, wherein the control information is for eliciting performance by the user equipment relay of
a reset operation, or
modification of bandwidth allocated to a dedicated bearer.

4. The method of claim 1, wherein the generated message is caused to be transmitted from the user equipment relay to the small cell.

5. The method of claim 4, wherein the control information is for
eliciting implementation by the small cell of a congestion control mechanism or for eliciting termination by the small cell of a congestion control mechanism, or
wherein the congestion control mechanism specifies that service to at least some user equipments not already being served by the small cell should be denied, or
wherein the congestion control mechanism specifies that service being provided to at least one user equipment being served by the small cell should be throttled.

6. The method of claim 4, wherein the control information indicates that a connection between the user equipment relay and a core network has been restored.

7. The method of claim 1, wherein the small cell and the user equipment relay are mounted on a common structural element.

8. Apparatus comprising:
at least one processor; and
at least one memory including computer program code which, when executed by the at least one processor, causes the apparatus:
to generate a message for communication over a local area network connection comprising an ethernet connection between a small cell and a user equipment relay, wherein the local area network connection is a wired connection between the small cell and the user equipment relay, wherein: the message includes an identifier included in an EtherType field of the message and indicating that the message includes control information for eliciting a responsive operation by a receiving one of the small cell and the user equipment relay, and the control information, and includes a medium access control address of the small cell and a medium access control address of the user equipment relay; and the user equipment relay is also connected to a macro cell; and
to transmit the generated message over the local area network connection from a transmitting one of the small cell and the user equipment relay to the receiving one of the small cell and the user equipment relay,
wherein the control information is for requesting a modification of a behavior, or triggering of a new behavior, of the receiving one of the small cell and the user equipment relay.

9. The apparatus of claim 8, wherein the generated message is caused to be transmitted from the small cell to the user equipment relay.

10. The apparatus of claim 9 wherein the control information is for eliciting performance by the user equipment relay of
a reset operation, or
a modification of bandwidth allocated to a dedicated bearer.

11. The apparatus of claim 8, wherein the generated message is caused to be transmitted from the user equipment relay to the small cell.

12. The apparatus of claim 11, wherein the control information is for eliciting implementation by the small cell of a congestion control mechanism or for eliciting termination by the small cell of a congestion control mechanism, or
wherein the congestion control mechanism specifies that service to at least some user equipments not already being served by the small cell should be denied, or
the congestion control mechanism specifies that service being provided to at least one user equipment being served by the small cell should be throttled.

13. The apparatus of claim 8, wherein the control information indicates that a connection between the user equipment relay and a core network has been restored.

14. The apparatus of claim 8, wherein the local area network connection is a wired connection between the small cell and the user equipment relay.

15. The apparatus of claim 8, wherein the small cell and the user equipment relay are mounted on a common structural element.

16. A non-transitory computer-readable medium having computer-readable code stored thereon, wherein the computer readable code, when executed by a least one processor, causes performance of at least:
determining that a message received over a local area network connection between a small cell and a user equipment relay includes an identifier which indicates that the message includes control information for eliciting a responsive operation by a receiving one of the small cell and the user equipment relay, and includes a medium access control address of the small cell and a medium access control address of the user equipment relay, wherein the local area network connection is a wired connection between the small cell and the user equipment relay; and
responding to the determination by decoding the control information and causing performance of the responsive operation,
wherein the control information is for requesting a modification of a behavior, or triggering of a new behavior, of the receiving one of the small cell and the user equipment relay.

17. A non-transitory computer-readable medium having computer-readable code stored thereon, wherein the computer readable code, when executed by a least one processor, causes performance of at least:
generating a message for communication over a local area network connection comprising an ethernet connection between a small cell and a user equipment relay, wherein the local area network connection is a wired connection between the small cell and the user equipment relay, wherein: the message includes an identifier included in an EtherType field of the message and indicating that the message includes control information for eliciting a responsive operation by a receiving one of the small cell and the user equipment relay, and the control information, and includes a medium access control address of the small cell and a medium access control address of the user equipment relay; and the user equipment relay is also connected to a macro cell; and
causing transmission of the generated message over the local area network connection from a transmitting one of the small cell and the user equipment relay to the receiving one of the small cell and the user equipment relay,
wherein the control information is for requesting a modification of a behavior, or triggering of a new behavior, of the receiving one of the small cell and the user equipment relay.

* * * * *